(12) United States Patent
Ning et al.

(10) Patent No.: US 12,216,534 B2
(45) Date of Patent: Feb. 4, 2025

(54) BMC TIME MANAGEMENT METHOD, SYSTEM AND APPARATUS, AND COMPUTER MEDIUM

(71) Applicant: SUZHOU METABRAIN INTELLIGENT TECHNOLOGY CO., LTD., Jiangsu (CN)

(72) Inventors: Zhaonan Ning, Jiangsu (CN); Binghui Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/572,137

(22) PCT Filed: Mar. 29, 2022

(86) PCT No.: PCT/CN2022/083548
§ 371 (c)(1),
(2) Date: Dec. 19, 2023

(87) PCT Pub. No.: WO2023/092919
PCT Pub. Date: Jun. 1, 2023

(65) Prior Publication Data
US 2024/0264899 A1  Aug. 8, 2024

(30) Foreign Application Priority Data
Nov. 25, 2021  (CN) .......................... 202111408561.1

(51) Int. Cl.
*G06F 11/07* (2006.01)
(52) U.S. Cl.
CPC ...... *G06F 11/0793* (2013.01); *G06F 11/0721* (2013.01)

(58) Field of Classification Search
CPC combination set(s) only.
See application file for complete search history.

(56) References Cited

U.S. PATENT DOCUMENTS

| 7,197,657 B1 * | 3/2007 | Tobias | G06F 1/14 |
| | | | 713/400 |
| 8,510,587 B2 * | 8/2013 | Shao | G06F 1/14 |
| | | | 713/400 |

(Continued)

FOREIGN PATENT DOCUMENTS

| CN | 104424041 A | 3/2015 |
| CN | 108415817 A | 8/2018 |

(Continued)

OTHER PUBLICATIONS

International Search Report issued for International Patent Application No. PCT/CN2022/083548 mailed Aug. 8, 2022, 9 pgs.

(Continued)

*Primary Examiner* — Zahid Choudhury
(74) *Attorney, Agent, or Firm* — Merchant & Gould P.C.

(57) ABSTRACT

A BMC time management method, system and apparatus, and a computer medium are provided. The BMC time management apparatus includes a BMC, a CPU and a BIOS, wherein the BMC is configured to send time loss information to a CPU after detecting a loss of time of the BMC; the CPU is configured to send, after receiving the time loss information, a notification of executing a time recovery operation to the BIOS; and the BIOS is configured to obtain time information in a CMOS after receiving the notification of executing the time recovery operation, and synchronize the time information to the BMC, so that the BMC recovers the time of the BMC based on the time information.

19 Claims, 2 Drawing Sheets

Send time loss information to a CPU after detecting a loss of time of the BMC, so that the CPU sends, after receiving the time loss information, a notification of executing a time recovery operation to a BIOS  — S101

Receive time information that is synchronized by the BIOS after receiving the notification of executing the time recovery operation, wherein the time information includes time information obtained in a CMOS by the BIOS  — S102

Recover the time of the BMC based on the time information  — S103

(56) References Cited

U.S. PATENT DOCUMENTS

| | | | |
|---|---|---|---|
| 9,477,545 B2 | 10/2016 | Guo | |
| 11,340,991 B2* | 5/2022 | Lambert | G06F 1/14 |
| 2008/0155244 A1* | 6/2008 | Shih | G06F 1/14 713/2 |
| 2015/0058665 A1* | 2/2015 | Guo | G06F 11/0793 714/10 |

FOREIGN PATENT DOCUMENTS

| | | |
|---|---|---|
| CN | 108873668 A | 11/2018 |
| CN | 113849336 A | 12/2021 |
| TW | 201100998 A | 1/2011 |

OTHER PUBLICATIONS

First Office Action issued for Chinese Patent Application No. 202111408561.1 dated Jan. 6, 2022, 17 pgs.
Search Report issued for Chinese Patent Application No. 202111408561.1 dated Dec. 29, 2021, 2 pgs.

\* cited by examiner

BMC TIME MANAGEMENT METHOD, SYSTEM AND APPARATUS, AND COMPUTER MEDIUM

CROSS-REFERENCE TO RELATED APPLICATIONS

The present application is a National Stage Application of PCT International Application No.: PCT/CN2022/083548 filed on Mar. 29, 2022, which claims priority to Chinese Patent Application 202111408561.1, filed in the China National Intellectual Property Administration on Nov. 25, 2021, the disclosure of which is incorporated herein by reference in its entirety.

TECHNICAL FIELD

The present disclosure relates to the technical field of servers, and more particularly, to a Baseboard Management Controller (BMC) time management method, system and apparatus, and a computer medium.

BACKGROUND

A BMC in a server has its own time system, but has no reference time. After being started, the BMC starts to run using a preset default time as the reference time. After the time of the BMC becomes invalid (i.e., after detecting a loss of time of the BMC), the BMC runs using the default time, which is usually inconsistent with the system time of the server, resulting in an error in the tasks performed by the BMC based on the default time, for example, an error caused by the inconsistency between a recording time of a log and the current time of the server. In order to make the time of the BMC consistent with the time of the server, a user may manually check an Intelligent Platform Management Interface (IPMI) Specification (SPEC), identify a parameter required by an IPMI command, manually calculate the parameter, obtain an Internet Protocol (IP) of the BMC of the server, and then use an IPMI command to recover the time of the BMC to the system time by applying the parameter.

However, some users are not familiar with the IPMI SPEC and have no idea concerning which IPMI command should be used to recover the time of the BMC. Even for a user who knows which IPMI command to use, he/she still needs to manually identify the meaning of each parameter in the IPMI command, and manually parse the current time into the parameter to be carried in the IPMI command, so that the difficulty of user operations is large, the operations to be performed are tedious, and thus the efficiency of recovering the time of the BMC is relatively low.

In summary, how to improve the efficiency of recovering the time of the BMC is a problem to be solved urgently by those having ordinary skill in the art.

SUMMARY

Embodiments of the present disclosure provide a BMC time management apparatus, which may solve the technical problem of how to improve the efficiency of recovering the time of a BMC to a certain extent. The embodiments of the present disclosure further provide a BMC time management method and system, and a computer-readable storage medium.

The embodiments of the present disclosure provide the following technical solutions.

A BMC time management apparatus includes a BMC, a Central Processing Unit (CPU), and a Basic Input Output System (BIOS), wherein
  the BMC is configured to send time loss information to the CPU after detecting a loss of time of the BMC;
  the CPU is configured to send, after receiving the time loss information, a notification of executing a time recovery operation to the BIOS; and
  the BIOS is configured to obtain time information in a Complementary Metal Oxide Semiconductor (CMOS) after receiving the notification of executing the time recovery operation, and synchronize the time information to the BMC, so that the BMC recovers the time of the BMC based on the time information.

In some exemplary embodiments, the CPU is configured to send the notification of executing the time recovery operation to the BIOS in a following manner:
  the CPU is configured to enter an interrupt state, so as to send the notification of executing the time recovery operation to the BIOS.

In some exemplary embodiments, the BMC is configured to send the time loss information to the CPU by changing a state of a first pin installed on the BMC; and
  the CPU is configured to receive the time loss information by detecting a change in a state of a second pin installed on the CPU,
  wherein the state of the first pin is associated with the state of the second pin.

In some exemplary embodiments, the first pin and the second pin are both General-Purpose Input/Output (GPIO) pins.

In some exemplary embodiments, the BMC is configured to change the state of the first pin installed on the BMC in a following manner:
  the BMC is configured to change a level of the first pin from a preset high level to a low level,
  wherein a level of the second pin changes from a preset high level to a low level.

A BMC time management method, performed by a BMC, includes:
  sending time loss information to a CPU after detecting a loss of time of the BMC, so that the CPU sends, after receiving the time loss information, a notification of executing a time recovery operation to a BIOS;
  receiving time information that is synchronized by the BIOS after receiving the notification of executing the time recovery operation, wherein the time information includes time information obtained in a CMOS by the BIOS; and
  recovering the time of the BMC based on the time information.

A BMC time management method, performed by a CPU, includes:
  receiving time loss information sent by a BMC; and
  sending a notification of executing a time recovery operation to a BIOS, so that the BIOS synchronizes time information to the BMC after receiving the notification of executing the time recovery operation, and then the BMC recovers time of the BMC based on the time information,
  wherein the time loss information includes information that is sent by the BMC after detecting a loss of the time of the BMC; and the time information includes time information obtained in a CMOS by the BIOS.

A BMC time management method, performed by a BIOS, includes:

receiving a notification of executing a time recovery operation, which is sent by a CPU;

obtaining time information in a CMOS; and synchronizing the time information to a BMC, so that the BMC recovers time of the BMC based on the time information, wherein the notification of executing the time recovery operation includes a notification that is sent by the CPU after receiving time loss information; and the time loss information includes information that is sent by the BMC after detecting a loss of the time of the BMC.

A BMC time management system, applied to a BMC, includes:

a first detection module, configured to send time loss information to a CPU after detecting a loss of time of the BMC, so that the CPU sends, after receiving the time loss information, a notification of executing a time recovery operation to a BIOS;

a first receiving module, configured to receive time information that is synchronized by the BIOS after receiving the notification of executing the time recovery operation, wherein the time information includes time information obtained in a CMOS by the BIOS; and a first recovery module, configured to recover the time of the BMC based on the time information.

A computer-readable storage medium, wherein a computer program is stored in the computer-readable storage medium, and when executed by a processor, the computer program implements the operations of any BMC time management method described above.

The BMC time management apparatus provided in the embodiments of the present disclosure includes a BMC, a CPU and a BIOS, wherein the BMC is configured to send time loss information to a CPU after detecting a loss of time of the BMC; the CPU is configured to send, after receiving the time loss information, a notification of executing a time recovery operation to the BIOS; and the BIOS is configured to obtain time information in a CMOS after receiving the notification of executing the time recovery operation, and synchronize the time information to the BMC, so that the BMC recovers the time of the BMC based on the time information. In the technical solution, after detecting a loss of time of the BMC, the BMC sends the time loss information to the CPU; after receiving the time loss information, the CPU notifies the BIOS to execute the time recovery operation; and correspondingly, the BIOS obtains the time information in the CMOS and synchronizes the time information to the BMC. Since the time in the CMOS is consistent with the time of a server, if the BMC recovers the time of the BMC based on the time information, the time of the BMC is consistent with the time of the server, and no manual operation is required in the entire process, such that the efficiency of recovering the time of the BMC may be improved. The BMC time management method and system and the computer-readable storage medium provided in the embodiments of the present disclosure also solve corresponding technical problems.

BRIEF DESCRIPTION OF THE DRAWINGS

To illustrate technical solutions in the embodiments of the present disclosure or in the related art more clearly, a brief introduction on the drawings which are needed in the description of the embodiments or the related art is given below. Apparently, the drawings in the description below are merely some of the embodiments of the present disclosure, based on which other drawings may be obtained by those having ordinary skill in the art without any creative effort.

DETAILED DESCRIPTION OF THE EMBODIMENTS

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those having ordinary skill in the art based on the embodiments in the present disclosure without any creative effort, fall into the protection scope of the present disclosure.

Figure 1:
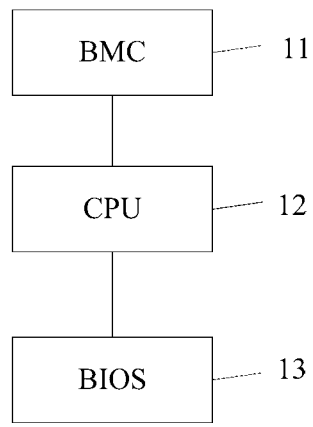
FIG. 1 is a first structural schematic diagram of a BMC time management apparatus provided in an embodiment of the present disclosure.

Please refer to FIG. 1, FIG. 1 is a first structural schematic diagram of a BMC time management apparatus provided in an embodiment of the present disclosure.

The BMC time management apparatus provided in the embodiment of the present disclosure may include a BMC 11, a CPU 12, and a BIOS 13.

The BMC 11 is configured to send time loss information to the CPU 12 after detecting a loss of time of the BMC 11.

The CPU 12 is configured to send, after receiving the time loss information, a notification of executing a time recovery operation to the BIOS 13.

The BIOS 13 is configured to obtain time information in a CMOS after receiving the notification of executing the time recovery operation, and synchronize the time information to the BMC 11, so that the BMC 11 recovers the time of the BMC 11 based on the time information.

In practical applications, since the CMOS in the CPU 12 of a server has its own time system, and meanwhile the CMOS is equipped with a button battery, it may be ensured that the CMOS still has an accurate reference time after being powered off for a long time. Therefore, when the BMC 11 needs to perform time recovery, the BMC 11 may perform time recovery based on the time information in the CMOS. In the technical solution provided in the embodiment of the present disclosure, by sending the time loss information, the BMC 11 triggers the CPU 12 to notify the BIOS 13 to execute the time recovery operation, and correspondingly, the BIOS 13 obtains the time information in the CMOS and synchronizes the time information to the BMC 11, so that the BMC 11 may recover its own time to a time consistent with the system time of the server based on the time information.

The BMC time management apparatus provided in the embodiments of the present disclosure includes: a BMC 11, configured to send time loss information to a CPU 12 after detecting a loss of time of the BMC 11; the CPU 12, configured to send, after receiving the time loss information, a notification of executing a time recovery operation to the BIOS 13; and the BIOS 13, configured to obtain time information in a CMOS after receiving the notification of executing the time recovery operation, and synchronize the time information to the BMC 11, so that the BMC 11 recovers the time of the BMC 11 based on the time information. In the embodiments of the present disclosure, after detecting a loss of time of the BMC 11, the BMC 11 sends the time loss information to the CPU 12; after receiving the time loss information, the CPU 12 notifies the BIOS 13 to execute the time recovery operation; and correspondingly, the BIOS 13 obtains the time information in the CMOS and synchronizes the time information to the BMC 11. Since the time in the CMOS is consistent with the time of the server, if the BMC 11 recovers the time of the BMC 11 based on the time information, the time of the BMC 11 is consistent with the time of the server, and no manual operation is required in the entire process, such that the efficiency of recovering the time of the BMC 11 may be improved.

In the BMC time management apparatus provided in the embodiment of the present disclosure, during the process that the CPU 12 sends the notification of executing the time recovery operation to the BIOS 13, in order to conveniently notify the BIOS 13 to execute the time recovery operation, the CPU 12 may enter an interrupt state, so as to send the notification of executing the time recovery operation to the BIOS 13 (i.e., notify the BIOS 13 to execute the time recovery operation).

In the BMC time management apparatus provided in the embodiment of the present disclosure, in order to facilitate the BMC 11 to send the time loss information to the CPU 12, corresponding pins may be installed on the BMC 11 and the CPU 12, and the states of the two pins are associated with each other. In this way, the BMC 11 may notify the CPU 12 of the loss of the time of the BMC 11 by means of changing the state of the pin installed on the BMC 11, that is, during the process that the BMC 11 sends the time loss information to the CPU 12, the BMC 11 may change the state of a first pin installed on the BMC 11; correspondingly, during the process that the CPU 12 receives the time loss information, after the CPU 12 detects that the state of a second pin installed on the CPU 12 changes, it means that the CPU 12 receives the time loss information. It is to be noted that the state of the first pin is associated with the state of the second pin, that is, after the state of the first pin changes, the state of the second pin also changes.

In the BMC time management apparatus provided in the embodiment of the present disclosure, in order to facilitate real-time performance, the first pin and the second pin are both GPIO pins.

Furthermore, in practical applications, during the process that the BMC 11 changes the state of the first pin installed on the BMC 11, the BMC 11 may change a level of the first pin from a preset high level to a low level, and correspondingly, a level of the second pin changes from a preset high level to a low level. Of course, there may also be other manners of changing the states of the first pin and the second pin, which is not specifically limited in the embodiments of the present disclosure.

In a practical application scenario, in order to facilitate the implementation, after detecting that the level of the second pin installed on the CPU 12 is changed from the preset high level to the low level, the CPU 12 may trigger an interrupt, for example, trigger a Serial Management Interface (SMI) and enter a Serial Management Mode (SMM). At this time, after detecting that the interrupt in the CPU 12 is caused by the change in the state of the level of the second pin, the BIOS 13 executes a serial management interface handling function (pre-registered SMI Handler), so as to obtain the time information in the CMOS and synchronize the time information to the BMC 11, so that the BMC 11 recovers the time of the BMC 11 based on the time information.

Figure 2:
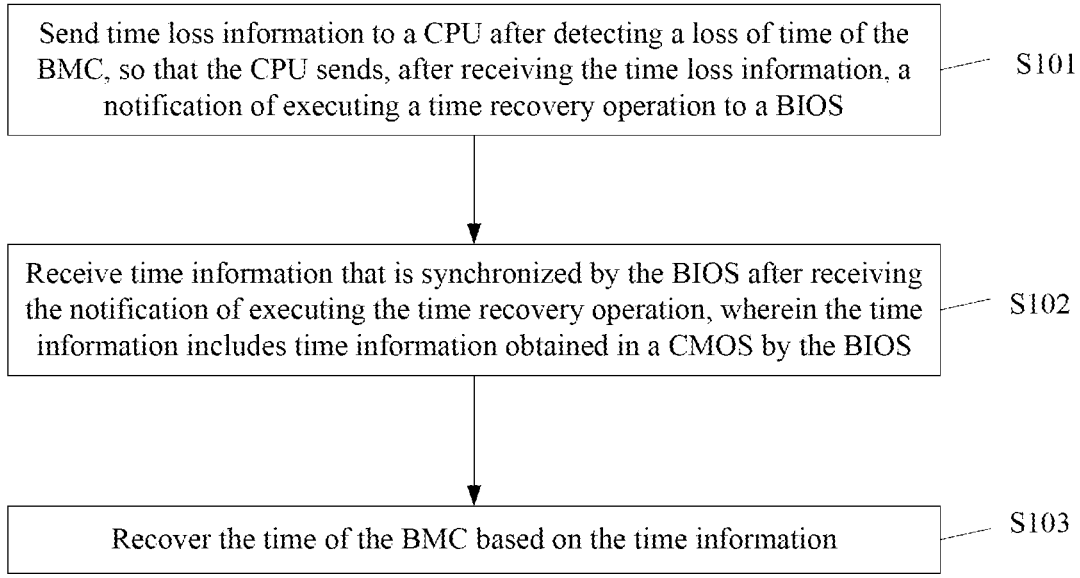
FIG. 2 is a first flowchart of a BMC time management method provided in an embodiment of the present disclosure.

Please refer to FIG. 2, FIG. 2 is a first flowchart of a BMC time management method provided in an embodiment of the present disclosure.

The BMC time management method provided in the embodiment of the present disclosure is performed by a BMC, and may include the following operations S101 to S103.

At S101, the BMC sends time loss information to a CPU after detecting a loss of time of the BMC, so that the CPU sends, after receiving the time loss information, a notification of executing a time recovery operation to a BIOS.

At S102, the BMC receives time information that is synchronized by the BIOS after receiving the notification of executing the time recovery operation, wherein the time information includes time information obtained in a CMOS by the BIOS.

At S103, the BMC recovers the time of the BMC based on the time information.

With regard to the description of corresponding operations executed by the BMC in the BMC time management method provided in the embodiment of the present disclosure, reference may be made to the above embodiments, and thus details are not described herein again.

Figure 3:
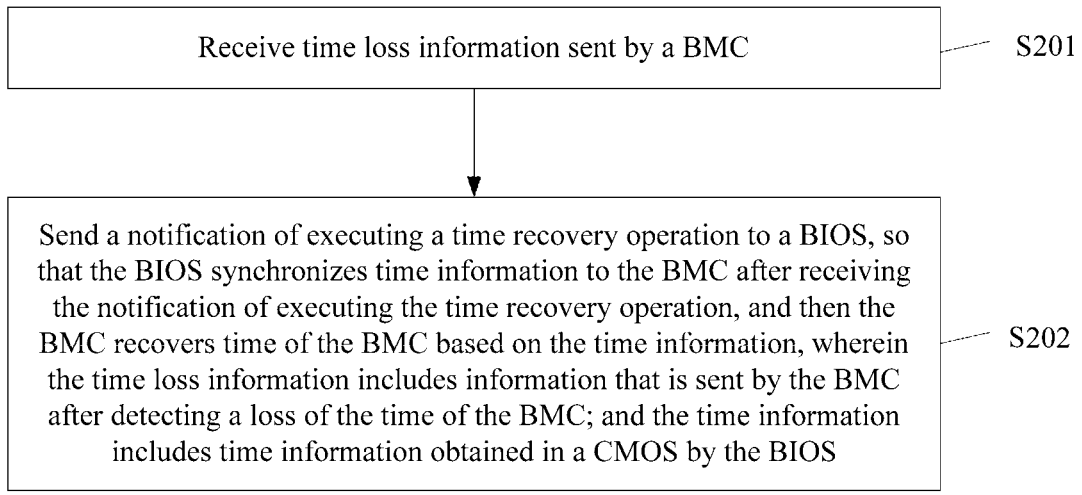
FIG. 3 is a second flowchart of a BMC time management method provided in an embodiment of the present disclosure.

Please refer to FIG. 3, FIG. 3 is a second flowchart of a BMC time management method provided in an embodiment of the present disclosure.

The BMC time management method provided in the embodiment of the present disclosure is performed by a CPU, and may include the following operations S201 and S202.

At S201, the CPU receives time loss information sent by a BMC.

At S202, the CPU sends a notification of executing a time recovery operation to a BIOS, so that the BIOS synchronizes time information to the BMC after receiving the notification of executing the time recovery operation, and then the BMC recovers time of the BMC based on the time information, wherein the time loss information includes information that is sent by the BMC after detecting a loss of the time of the BMC; and the time information includes time information obtained in a CMOS by the BIOS.

With regard to the description of corresponding operations executed by the CPU in the BMC time management method provided in the embodiment of the present disclosure, reference may be made to the above embodiments, and thus details are not described herein again.

Figure 4:
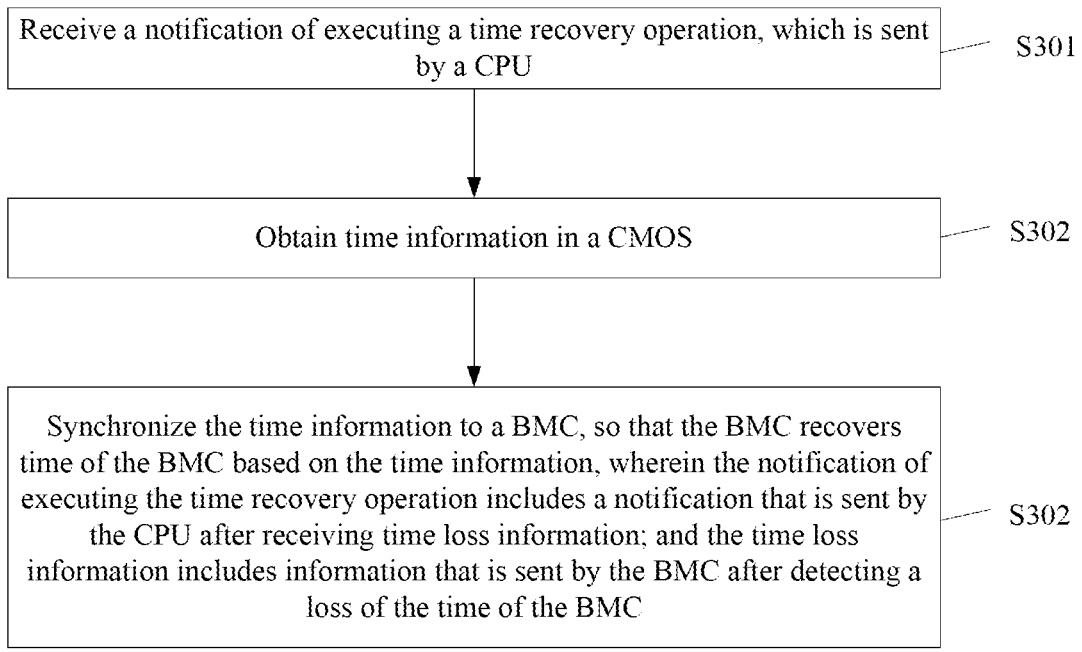
FIG. 4 is a third flowchart of a BMC time management method provided in an embodiment of the present disclosure.

Please refer to FIG. 4, FIG. 4 is a third flowchart of a BMC time management method provided in an embodiment of the present disclosure.

The BMC time management method provided in the embodiment of the present disclosure is performed by a BIOS, and may include the following operations S301 to S303.

At S301, the BIOS receives a notification of executing a time recovery operation, which is sent by a CPU.

At S302, the BIOS obtains time information in a CMOS.

At S303, the BIOS synchronizes the time information to a BMC, so that the BMC recovers time of the BMC based on the time information, wherein the notification of executing the time recovery operation includes a notification that is sent by the CPU after receiving time loss information; and the time loss information includes information that is sent by the BMC after detecting a loss of the time of the BMC.

With regard to the description of corresponding operations executed by the BIOS in the BMC time management method provided in the embodiment of the present disclosure, reference may be made to the above embodiments, and thus details are not described herein again.

A BMC time management system provided in an embodiment of the present disclosure is applied to a BMC, and may include:
- a first detection module, configured to send time loss information to a CPU after detecting a loss of time of the BMC, so that the CPU sends, after receiving the time loss information, a notification of executing a time recovery operation to a BIOS;
- a first receiving module, configured to receive time information that is synchronized by the BIOS after receiving the notification of executing the time recovery operation, wherein the time information includes time information obtained in a CMOS by the BIOS; and
- a first recovery module, configured to recover the time of the BMC based on the time information.

With regard to specific operations executed by corresponding modules in the BMC time management system provided in the embodiment of the present disclosure, reference may be made to the above embodiments, and thus details are not described herein again.

A BMC time management system provided in an embodiment of the present disclosure is applied to a CPU, and may include:
- a second receiving module, configured to receive time loss information sent by a BMC; and
- a first notification module, configured to send a notification of executing a time recovery operation to a BIOS, so that the BIOS synchronizes time information to the BMC after receiving the notification of executing the time recovery operation, and then the BMC recovers time of the BMC based on the time information,
- wherein the time loss information includes information that is sent by the BMC after detecting a loss of the time of the BMC; and the time information includes time information obtained in a CMOS by the BIOS.

With regard to specific operations executed by corresponding modules in the BMC time management system provided in the embodiment of the present disclosure, reference may be made to the above embodiments, and thus details are not described herein again.

A BMC time management system provided in an embodiment of the present disclosure is applied to a BIOS, and may include:
- a third receiving module, configured to receive a notification of executing a time recovery operation, which is sent by a CPU;
- a first obtaining module, configured to obtain time information in a CMOS; and
- a first synchronization module, configured to synchronize the time information to a BMC, so that the BMC recovers time of the BMC based on the time information,
- wherein the notification of executing the time recovery operation includes a notification that is sent by the CPU after receiving time loss information; and the time loss information includes information that is sent by the BMC after detecting a loss of the time of the BMC.

With regard to specific operations executed by corresponding modules in the BMC time management system provided in the embodiment of the present disclosure, reference may be made to the above embodiments, and thus details are not described herein again.

According to a computer-readable storage medium provided in an embodiment of the present disclosure, a computer program is stored in the computer-readable storage medium, and when executed by a processor, the computer program implements corresponding operations in the BMC time management method described in any embodiment described above.

The computer-readable storage medium involved in the embodiments of the present disclosure includes a Random Access Memory (RAM), a memory, a Read-Only Memory (ROM), an Electrically Programmable ROM, an Electrically Erasable Programmable ROM, a register, a hard disk, a removable disk, a CD-ROM, or any other form of storage medium known in the technical field.

With regard to the description of related parts of the BMC time management method and system, and the computer-readable storage medium provided in the embodiments of the present disclosure, reference may be made to detailed description of corresponding parts of the BMC time management apparatus, and thus details are not described herein again. In addition, in the above technical solutions provided in the embodiments of the present disclosure, the parts consistent with the implementation principle of corresponding technical solutions in the related art are not described in detail, so as to avoid repeated descriptions.

It should also be noted that, in the present disclosure, relational terms, such as first and second, are merely used for distinguishing one entity or operation from another entity or operation, and do not necessarily require or imply that any such actual relationship or order exists between these entities or operations. Moreover, the terms "include", "contain" or any other variants thereof are intended to cover non-exclusive inclusions, such that a process, a method, an article or a device including a series of elements not only includes those elements, but may further include other elements that are not explicitly listed, or may also includes elements inherent to such a process, method, article or device. If there are no more restrictions, the element defined by the sentence "including a . . . " does not exclude the existence of other identical elements in the process, the method, the article or the device that includes the element.

The foregoing description of the disclosed embodiments enables those having ordinary skill in the art to implement or use the present disclosure. Various modifications to these embodiments will be apparent to those having ordinary skill in the art, and general principles defined herein may be implemented in other embodiments without departing from the principle or scope of the present disclosure. Therefore, the present disclosure will not be limited to these embodiments shown herein, but is intended to conform to the widest scope consistent with the principles and novel features disclosed herein.

What is claimed is:

1. A Baseboard Management Controller (BMC) time management apparatus, comprising a BMC, a Central Processing Unit (CPU), and a Basic Input Output System (BIOS), wherein
   the BMC is configured to send time loss information to the CPU after detecting a loss of time of the BMC;
   the CPU is configured to send, after receiving the time loss information, a notification of executing a time recovery operation to the BIOS; and
   the BIOS is configured to obtain time information in a Complementary Metal Oxide Semiconductor (CMOS) after receiving the notification of executing the time recovery operation, and synchronize the time information to the BMC, so that the BMC recovers the time of the BMC based on the time information;
wherein the BMC is configured to send the time loss information to the CPU by changing a state of a first pin installed on the BMC; and
the CPU is configured to receive the time loss information by detecting a change in a state of a second pin installed on the CPU,
wherein the state of the first pin is associated with the state of the second pin.

2. The BMC time management apparatus according to claim 1, wherein the CPU is configured to send the notification of executing the time recovery operation to the BIOS in a following manner:
the CPU is configured to enter an interrupt state, so as to send the notification of executing the time recovery operation to the BIOS.

3. The BMC time management apparatus according to claim 1, wherein the first pin and the second pin are both General-Purpose Input/Output (GPIO) pins.

4. The BMC time management apparatus according to claim 1, wherein the BMC is configured to change the state of the first pin installed on the BMC in a following manner:
the BMC is configured to change a level of the first pin from a preset high level to a low level,
wherein a level of the second pin changes from a preset high level to a low level.

5. The BMC time management apparatus according to claim 4, wherein after detecting that the level of the second pin installed on the CPU changes from the preset high level to the low level, the CPU is configured to trigger a Serial Management Interface (SMI) and enter a Serial Management Mode (SMM).

6. The BMC time management apparatus according to claim 5, wherein after detecting that the SMI in the CPU is caused by the change in the state of the level of the second pin, the BIOS is configured to execute a serial management interface handling function.

7. A Baseboard Management Controller (BMC) time management method, performed by a BIOS in the BMC time management apparatus according to claim 1 and comprising:
receiving a notification of executing a time recovery operation, which is sent by a Central Processing Unit (CPU);
obtaining time information in a Complementary Metal Oxide Semiconductor (CMOS); and
synchronizing the time information to a BMC, so that the BMC recovers time of the BMC based on the time information,
wherein the notification of executing the time recovery operation comprises a notification that is sent by the CPU after receiving time loss information; and the time loss information comprises information that is sent by the BMC after detecting a loss of the time of the BMC.

8. The BMC time management method according to claim 7, wherein synchronizing the time information to the BMC comprises:
synchronizing the time information to the BMC by executing a serial management interface handling function.

9. The BMC time management method according to claim 8, wherein after detecting that a Serial Management Interface (SMI) in the CPU is caused by a change in a state of a level of a second pin installed on the CPU, the BIOS executes the serial management interface handling function, wherein a state of a first pin installed on a BMC is associated with the state of the second pin, and the state of the first pin is changed by the BMC to send the time loss information to the CPU.

10. A Baseboard Management Controller (BMC) time management method, performed by a BMC and comprising:
sending time loss information to a Central Processing Unit (CPU) after detecting a loss of time of the BMC, so that the CPU sends, after receiving the time loss information, a notification of executing a time recovery operation to a Basic Input Output System (BIOS);
receiving time information that is synchronized by the BIOS after receiving the notification of executing the time recovery operation, wherein the time information comprises time information obtained in a Complementary Metal Oxide Semiconductor (CMOS) by the BIOS; and
recovering the time of the BMC based on the time information;
wherein the BMC is configured to send the time loss information to the CPU by changing a state of a first pin installed on the BMC; and
the CPU is configured to receive the time loss information by detecting a change in a state of a second pin installed on the CPU,
wherein the state of the first pin is associated with the state of the second pin.

11. A non-transitory computer-readable storage medium, wherein a computer program is stored in the non-transitory computer-readable storage medium, and when executed by a processor, the computer program implements the operations of the BMC time management method according to claim 10.

12. The BMC time management method according to claim 10, wherein sending the time loss information to the CPU comprises:
sending the time loss information to the CPU by changing a state of a first pin installed on the BMC, such that the CPU receives the time loss information by detecting a change in a state of a second pin installed on the CPU, wherein the state of the first pin is associated with the state of the second pin.

13. The BMC time management method according to claim 12, wherein the first pin and the second pin are both General-Purpose Input/Output (GPIO) pins.

14. The BMC time management method according to claim 12, wherein changing the state of the first pin installed on the BMC comprises:
changing a level of the first pin from a preset high level to a low level, such that a level of the second pin changes from a preset high level to a low level.

15. A Baseboard Management Controller (BMC) time management method, performed by a CPU and comprising:
receiving time loss information sent by a BMC; and
sending a notification of executing a time recovery operation to a BIOS, so that the BIOS synchronizes time information to the BMC after receiving the notification of executing the time recovery operation, and then the BMC recovers time of the BMC based on the time information,
wherein the time loss information comprises information that is sent by the BMC after detecting a loss of the time of the BMC; and the time information comprises time information obtained in a Complementary Metal Oxide Semiconductor (CMOS) by the BIOS;
wherein the BMC is configured to send the time loss information to the CPU by changing a state of a first pin installed on the BMC; and the CPU is configured to receive the time loss information by detecting a change in a state of a second pin installed on the CPU, wherein the state of the first pin is associated with the state of the second pin.

16. The BMC time management method according to claim 15, wherein sending the notification of executing the time recovery operation to the BIOS comprises:

entering an interrupt state, so as to send the notification of executing the time recovery operation to the BIOS.

17. The BMC time management method according to claim 15, wherein receiving the time loss information comprises:

detecting a change in a state of a second pin installed on the CPU, wherein a state of the first pin installed on a BMC is associated with the state of the second pin, and the state of the first pin is changed by the BMC to send the time loss information to the CPU.

18. The BMC time management method according to claim 17, wherein when a level of the first pin is changed by the BMC from a preset high level to a low level, a level of the second pin changes from a preset high level to a low level.

19. The BMC time management method according to claim 18, wherein after detecting that the level of the second pin installed on the CPU changes from the preset high level to the low level, the CPU triggers a Serial Management Interface (SMI) and enters a Serial Management Mode (SMM).

* * * * *